United States Patent [19]

Sato et al.

[11] Patent Number: 4,530,428
[45] Date of Patent: Jul. 23, 1985

[54] APPARATUS FOR TRANSPORTING MATERIALS TO BE TRANSFERRED AND METHOD OF CONTROLLING EXCITING CURRENT THEREFOR

[75] Inventors: Katsutoshi Sato; Susumu Itoh; Masaru Aoshima, all of Hitachi, Japan

[73] Assignee: Hitachi, Ltd., Tokyo, Japan

[21] Appl. No.: 511,480

[22] Filed: Jul. 7, 1983

[30] Foreign Application Priority Data

Jul. 9, 1982 [JP] Japan .................. 57-118369

[51] Int. Cl.$^3$ ............................ B65B 11/20
[52] U.S. Cl. ........................................ 193/40
[58] Field of Search ................... 193/38–41; 188/164, 165; 310/12; 318/135

[56] References Cited

U.S. PATENT DOCUMENTS 3,882,981 5/1975 Izumidate et al. ............... 193/40
4,088,213 5/1978 Nakamura et al. .............. 193/40
4,191,286 3/1980 Sato et al. ....................... 193/40

FOREIGN PATENT DOCUMENTS 49766 4/1979 Japan ........................... 193/40

Primary Examiner—Jeffrey V. Nase
Attorney, Agent, or Firm—Antonelli, Terry & Wands

[57] ABSTRACT

A steel pipe transporting apparatus and a method for controlling the same wherein the apparatus includes a plurality of said rails slantingly arranged from a feed-in end to a feed-out end so as to enable transportation of the steel pipe by causing the steel pipe to roll down on the skid rails from the feed-in end to the feed-out end. A plurality of electromagnets are arranged along the skid rails from the feed-in end to the feed-out end and each of the electromagnets include an inner pole with an exciting coil wound thereon and a pair of outer poles. The pair of outer poles have an upper end connected with a skid rail and a lower end connected with a common base, the inner poles having a lower end connected to the common base and an upper end arranged so as to face the steel pipe when transported on the skid rails so that the upper end portions of the inner poles are magnetically separated from each other. The electromagnets are divided into a plurality of groups and an exciting current is applied to the electromagnets group by group in order so as to cause the steel pipe to roll down along the skid rails.

9 Claims, 39 Drawing Figures

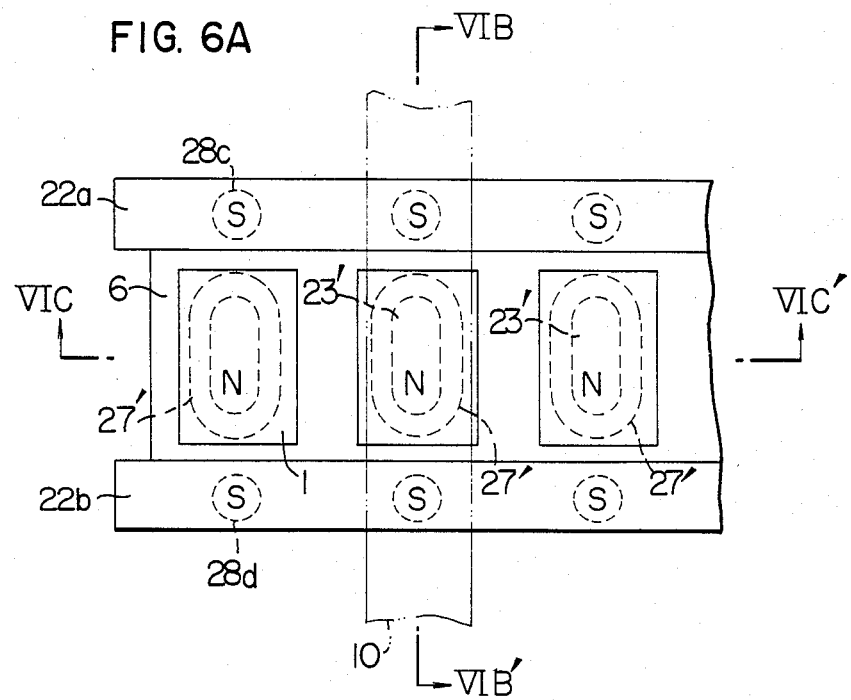
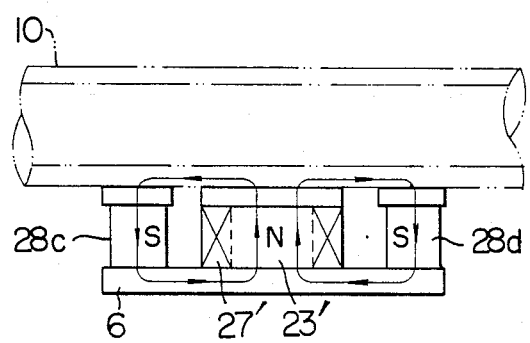
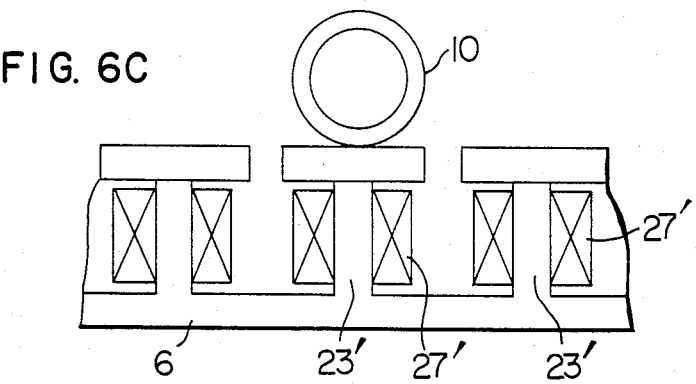

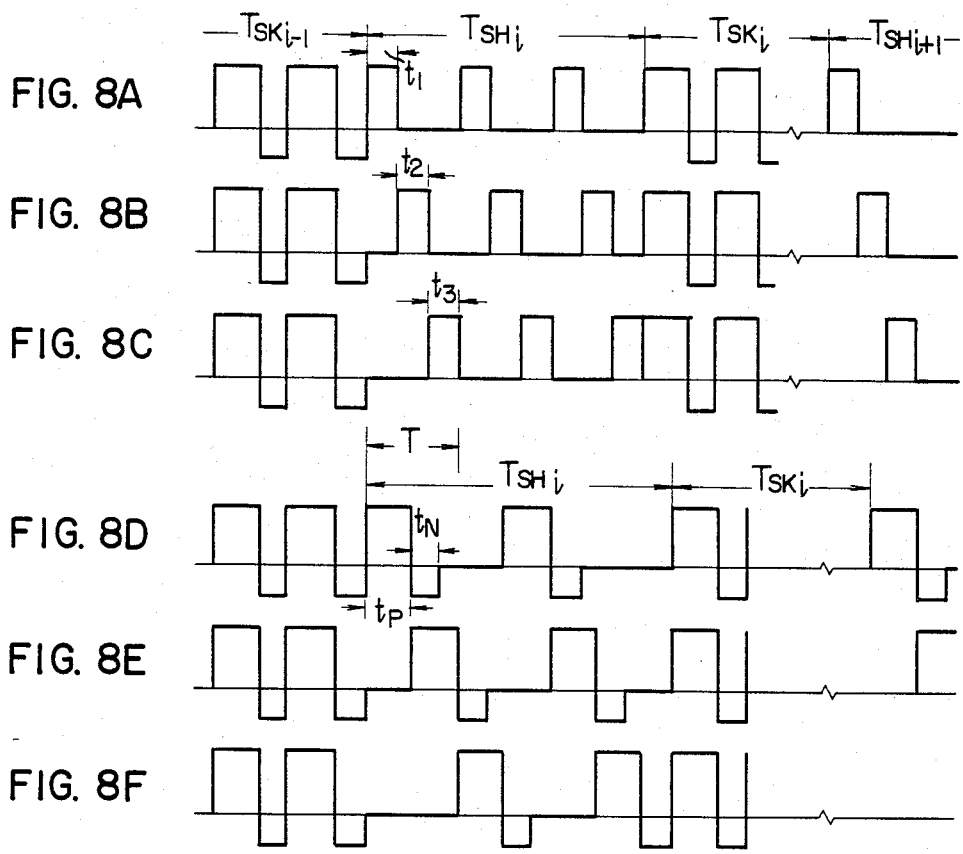
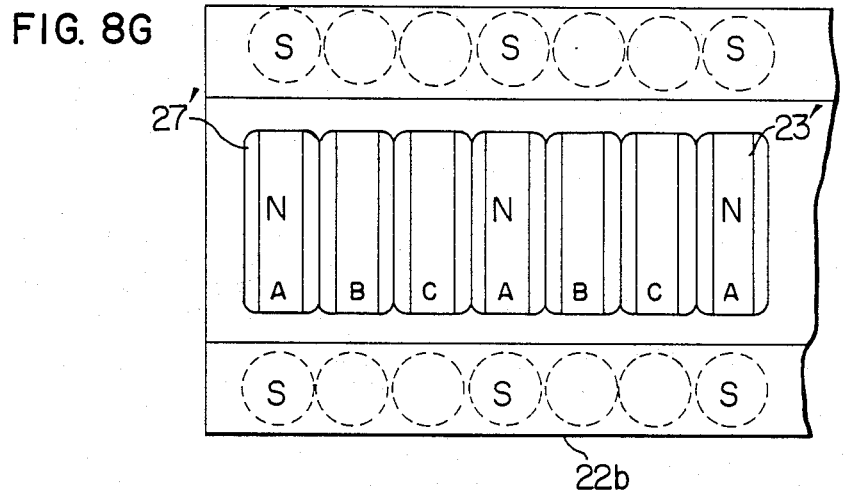

APPARATUS FOR TRANSPORTING MATERIALS TO BE TRANSFERRED AND METHOD OF CONTROLLING EXCITING CURRENT THEREFOR

The present invention relates to an apparatus for transporting materials such as steel pipes.

Steel pipes manufactured at a steel pipe producing department in an iron works, or the like, are transported by a conveyer, such as a roller conveyer, a chain conveyer with attachments. For some reasons such as the transportation of the steel pipes between such conveyers, waiting time adjustment between the preceding and succeeding machinings inspection and marking, or drying after application of anticorrosive composition, the pipes are sometimes rolled down on inclined skid rails. There occur problems that a steel pipe rolling down on the skid rails and accelerated by its gravity may collide with a steel pipe which has been transported and stopped so that collision noises are generated and deformations or cracks of the pipes are produced due to the collision between the pipes.

Further, in such a transportation apparatus, there is another problem such that, in the case of a steel pipe with a longitudinal bead or a curved steel pipe with no bead, such a pipe may become impossible to continue the rolling down and stop on the skid rails. Such a problem is apt to occur when the angle of inclination of the skid rails is made small in order to suppress the collision noises during the rolling transportation.

If retardation of a steel pipe has once occurred, the flow of steel pipes is confused to interfere the steel pipe transportation. The present invention relates to a method and an apparatus for transporting steel pipes, in which even if a steel pipe with a bead or a curved steel pipe is brought on the skid rails, the steel pipe does not retard on one hand and the possible collision noises between steel pipes are suppressed as small as possible.

As described above, the mutual collision between steel pipes, as generated when the steel pipes are rolling down on the skid rails, are undesired because faults such as cracks may be caused in the steel pipes due to the collision. Further, the noises generated by such collision are also undesired in view of working environment. There have been proposed various control apparatuses for applying suitable braking force to rolling steel pipes to cause the steel pipes to be in soft contact with each other.

For example, U.S. Pat. No. 3,882,981, entitled "Silencing Means for Steel Pipe Production Lines", issued May 13, 1975 discloses an apparatus in which the rolling steel pipes constitute a part of magnetic path so as to generate electromagnetic force which is used as the braking force for controlling the steel pipes. U.S. Pat. No. 4,088,213, entitled "Apparatus for Transporting Cylindrical Steel Articles", issued May 9, 1978 discloses an apparatus in which swing magnetic poles are provided to further increase the braking force and electromagnet means is excited intermittently in the forward and backward directions alternately.

Further improvement has been proposed to reduce the power consumption for braking force and also the cost of production as small as possible, as shown in U.S. Pat. No. 4,191,286, entitled "Apparatus for Transporting Cylindrical Steel Articles", issued Mar. 4, 1980.

In the above U.S. Patents, the braking force applied to a steel pipe is produced, (1) by the electromagnetic attraction force produced in an electromagnetic coil, (2) by increased frictional force between a steel pipe and the skid rails due to the electromagnetic attraction force, and (3) by an eddy current induced in a steel pipe due to magnetic flux generated by the electromagnetic coil.

However, a steel pipe having a bead or a curved steel pipe often stops rolling in the midway on the skid rails. Thus, there is a drawback in this case that steel pipes successively fed are blocked by the steel pipe which has stopped its rolling. In such a case, conventionally, various measures have been taken such that an operator applies rolling force to the steel pipes to clear the retard of pipes by using a wooden rod or the like, or means such as a hydraulic kicker is attached to the skid rails so that when retard of pipes occurs the hydraulic kicker is actuated to apply rolling force to the pipes to clear the retard, while the kicker is normally kept in its inoperative position where the kicker does not prevent the rolling down of the steel pipes.

The latter measure requires a complex apparatus and therefore it is most usual to rely on the manual operation by an operator.

An object of the present invention is to provide an apparatus for transporting materials in which the materials are rolled down on skid rails without stopping.

Another object of the present invention is to provide an apparatus for transporting materials in which the rolling down of the materials is smoothly attained on skid rails even when the steel pipes have beads or curved portions.

To attain the above-mentioned objects, the present invention is featured in that the excitation of electromagnetic coils is controlled to swing the material to be transferred by electromagnetic force so that the material is forcibly rolled down against its stoppage due to its bead or curved portion.

Another feature of the present invention is that the arrangement of electromagnets is improved such that stronger swing force can be applied to the retarded materials.

A further feature of the present invention is that shocks and/or noises due to mutual collision between materials to be transferred can be reduced as low as possible, that is novel excitation control is performed so that the retardation of materials to be transferred can be avoided without deteriorating the functions of the conventional low-noise steel-pipe transporting apparatus as mentioned hereinbefore.

The above and other objects, features and advantages of the present invention will be apparent from the following detailed description of the preferred embodiments of the invention in conjunction with the accompanying drawings, in which.

Figure 5A:
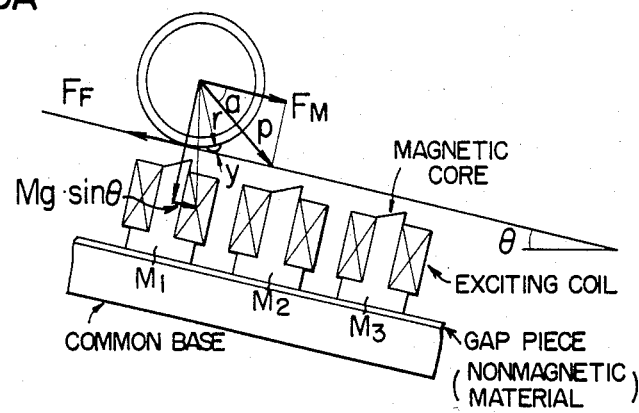
Figure 5B:
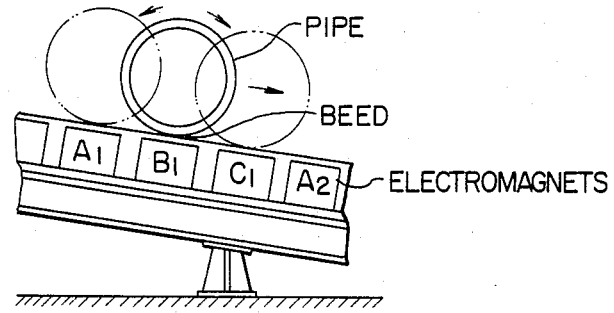
Figure 5C:
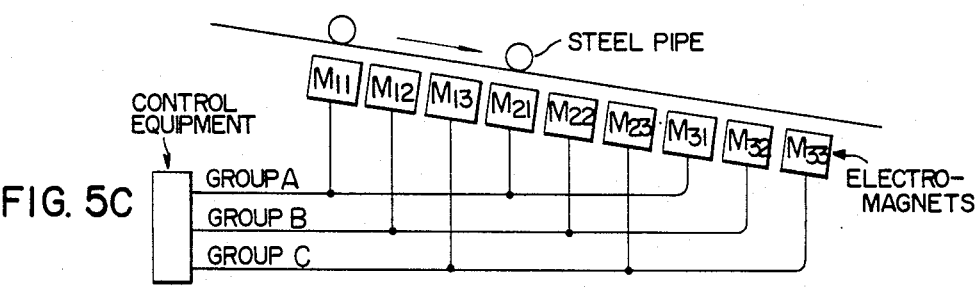
Figure 5D:
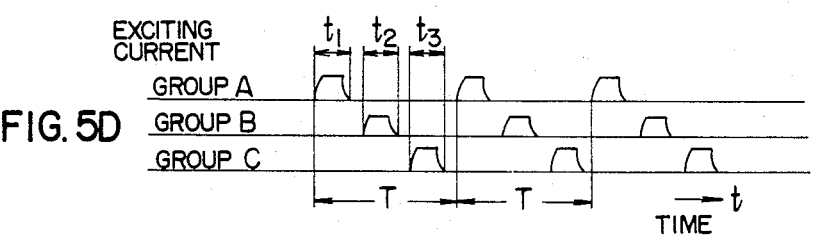
Figure 5E:
Figure 7A:
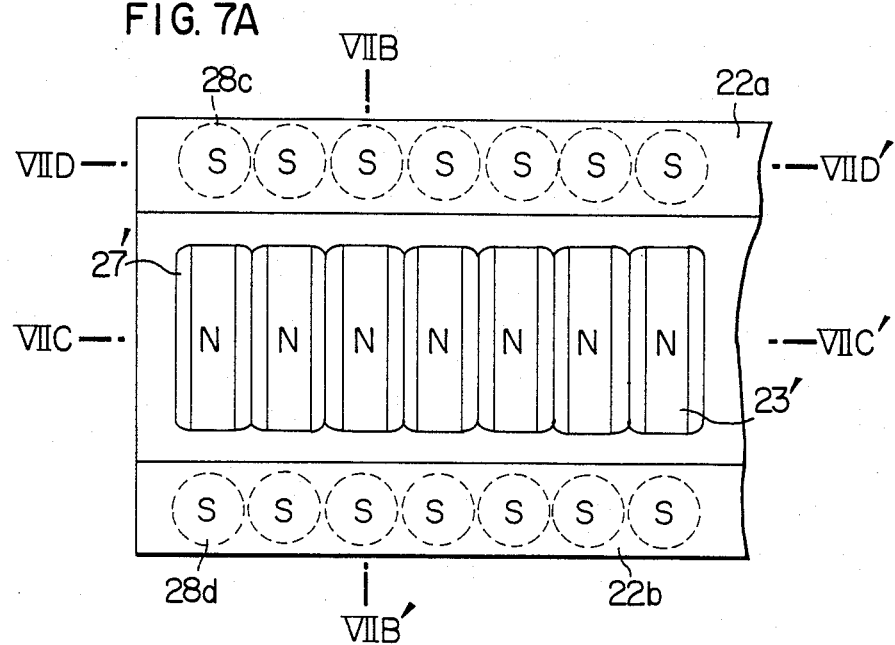
Figure 7B:
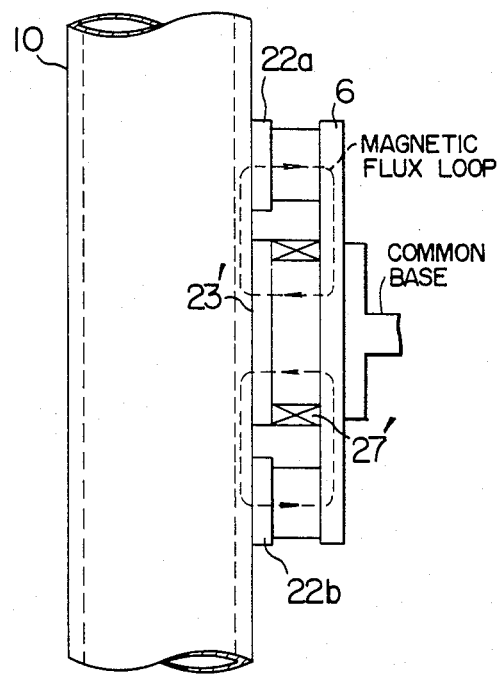
Figure 7C:
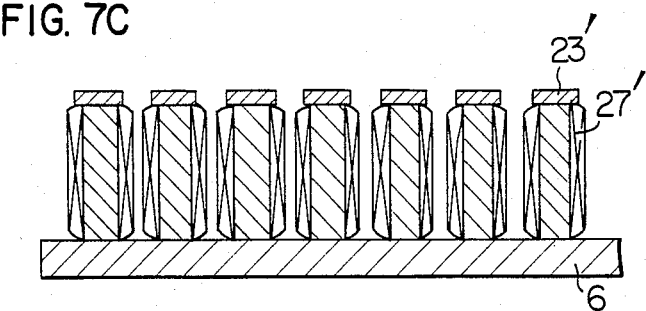
Figure 7D:
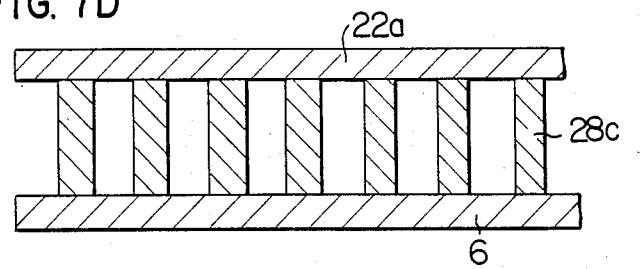
Figure 7E:
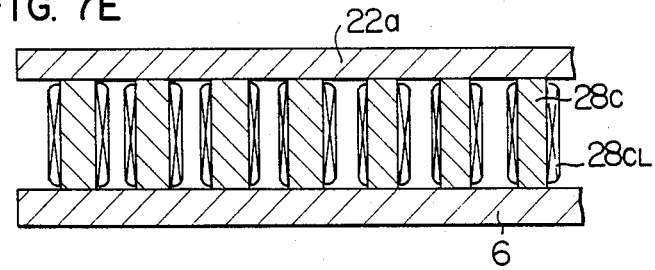
Figure 7F:
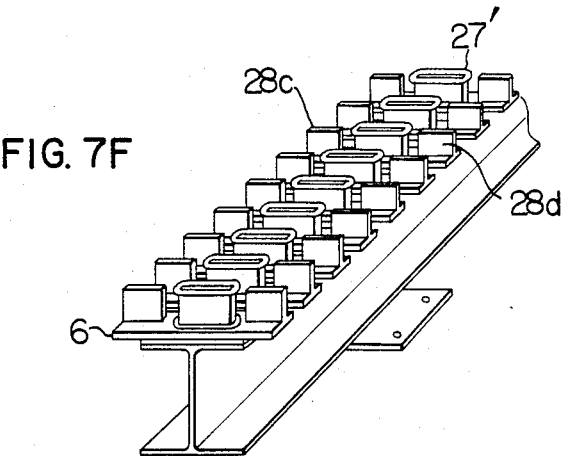
Figure 9A:
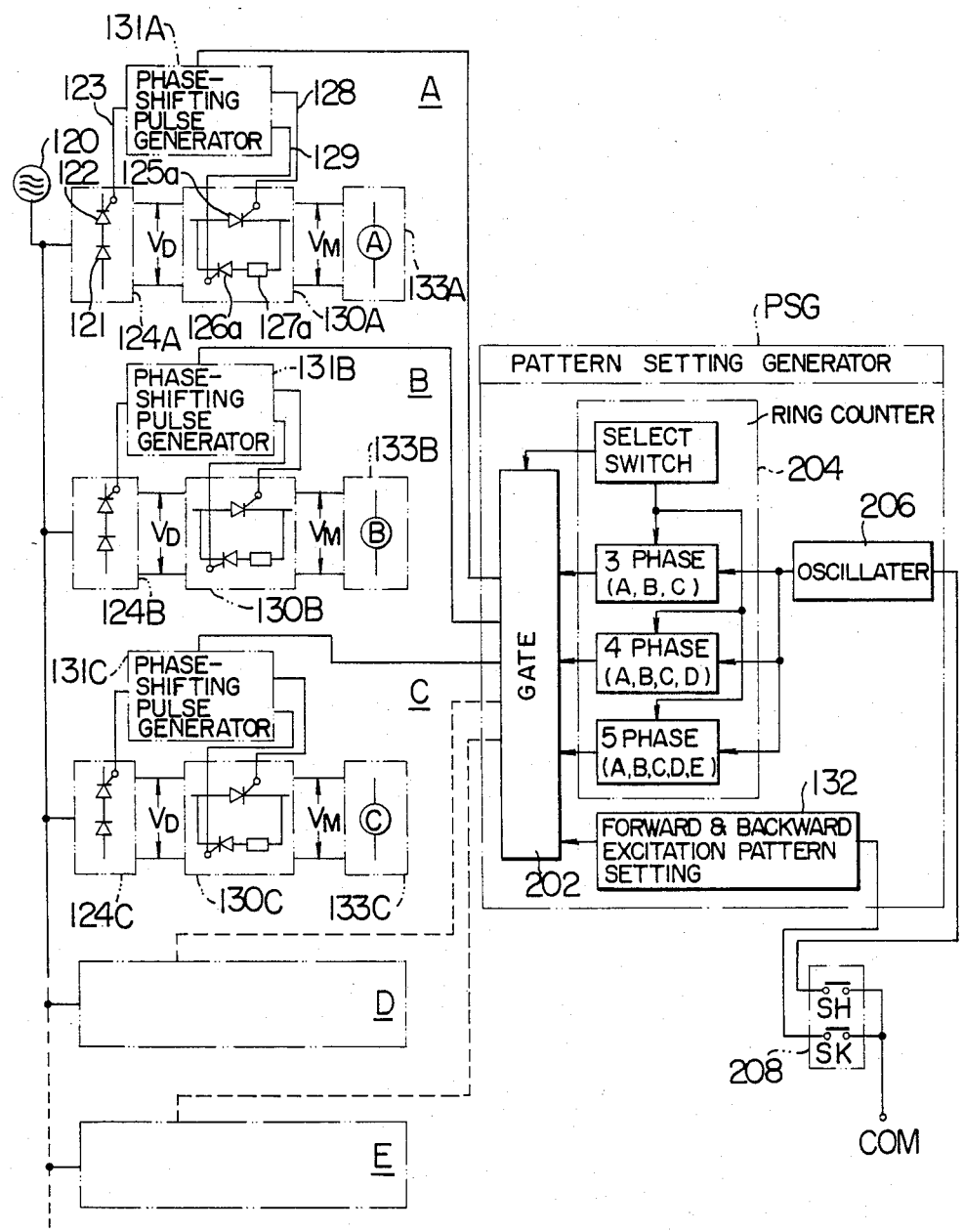
Figure 9B:
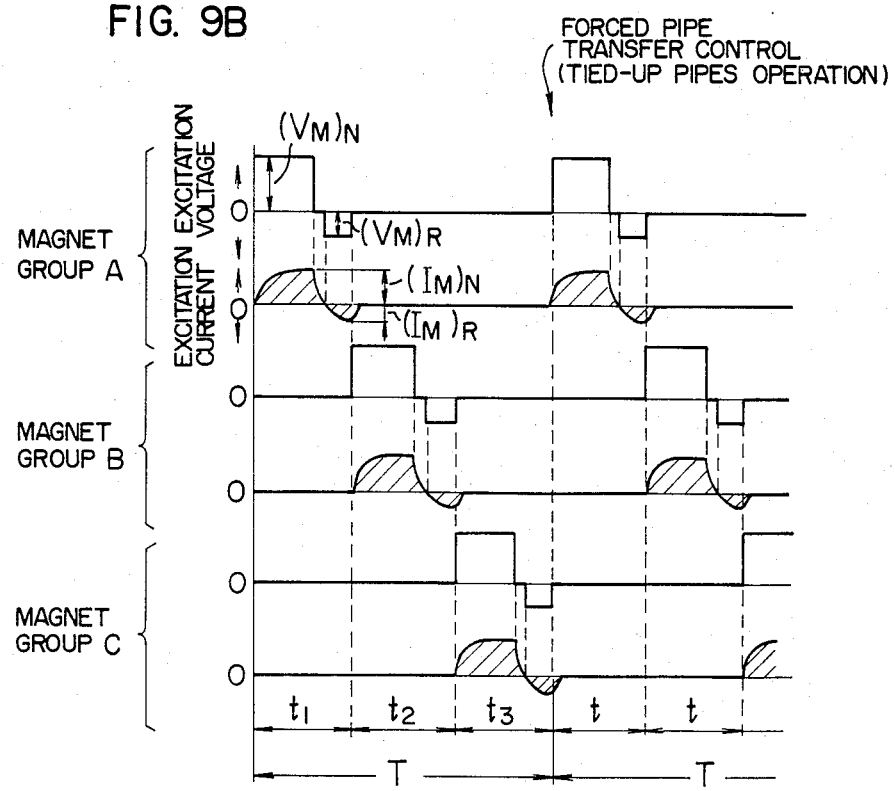
Figure 9C:
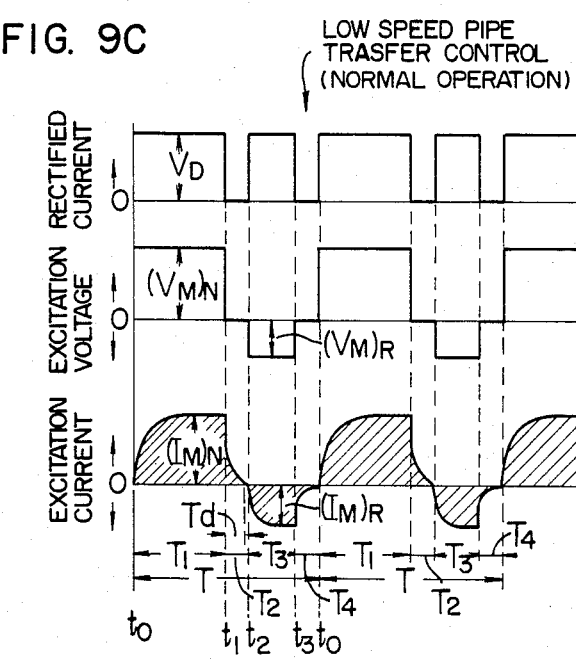
Figure 10:
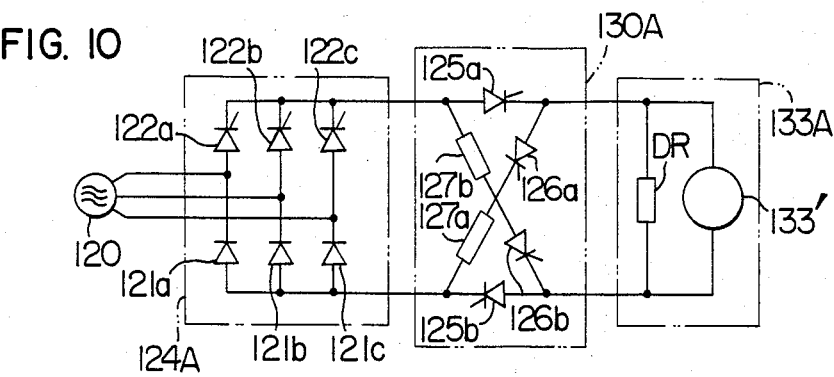
Figure 11:
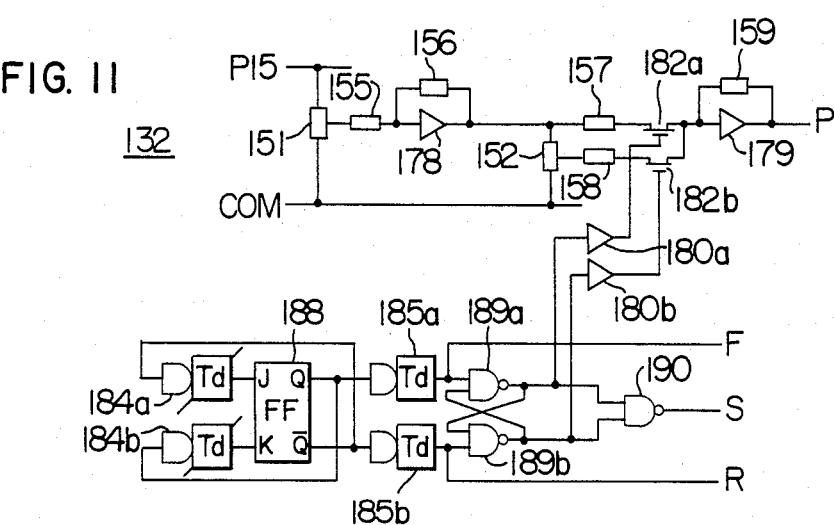
Figure 12:
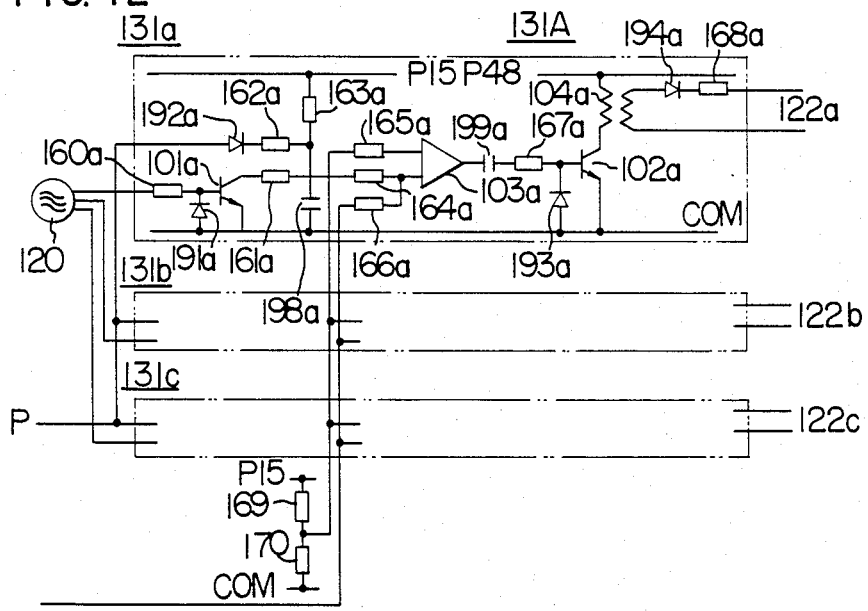
Figure 13:
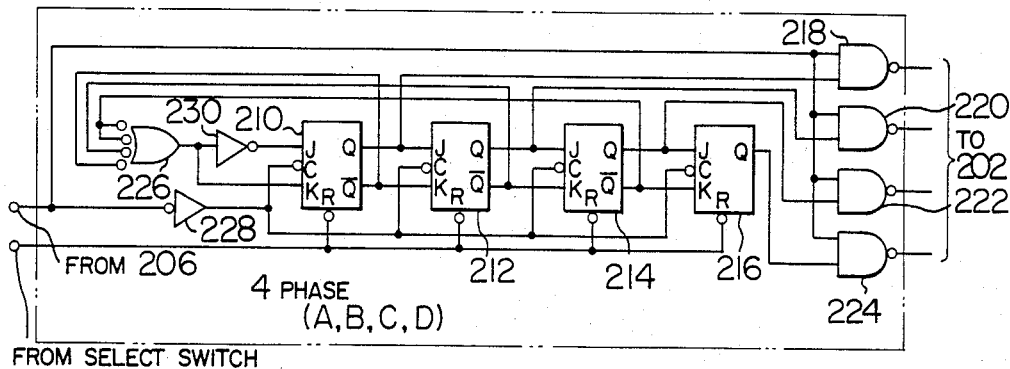
Figure 14A:
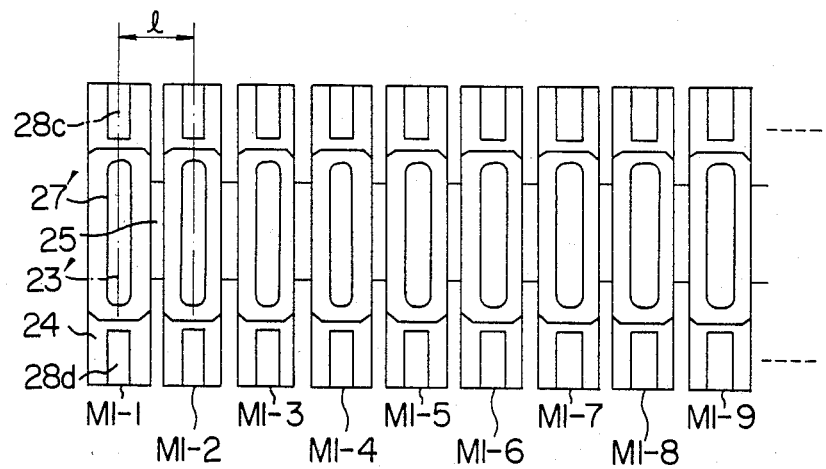
Figure 14B:
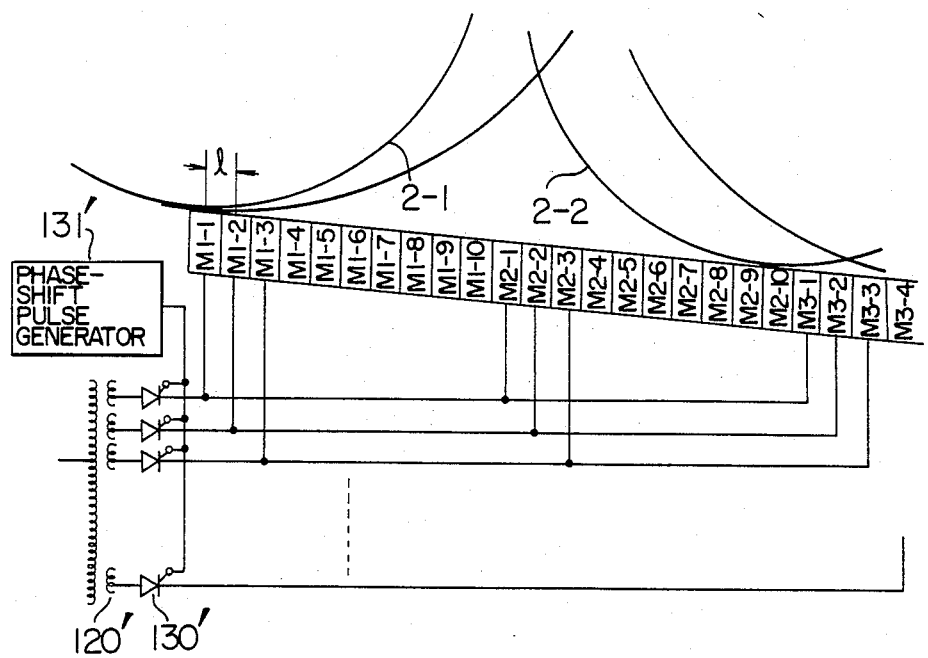
Figure 14C:
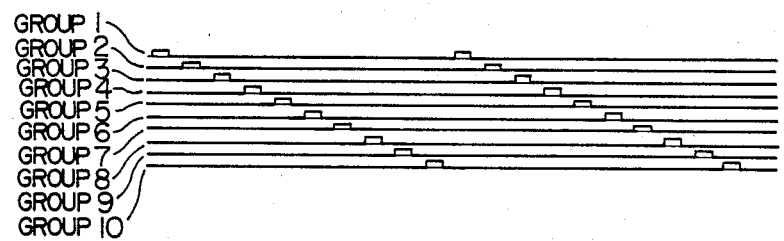
Figure 15:
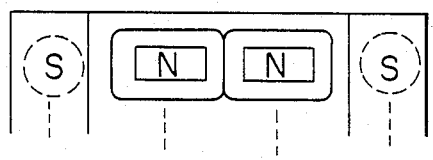

FIGS. 5A to 5E are diagrams for explaining the principle of the present invention, in which FIG. 5A is a diagram for explaining the functional relationship between a steel pipe with a bead and the electromagnets, FIG. 5B shows the state in which a steel pipe with a bead is swung by electromagnetic force applied thereto, FIG. 5C is a schematic diagram illustrating the case where the electromagnets are divided into groups so that the excitation is performed with respect to every group, FIG. 5D shows the waveforms of excitation currents for the respective groups, and FIG. 5E is a waveform illustrating the speed of a rolling steel pipe;

FIGS. 6A to 6C show the basic arrangement of the electromagnets according to the present invention, in which FIG. 6A is a plan view of the arrangement, FIG. 6B is a cross-section along VIB—VIB' in FIG. 6A, and FIG. 6C is a cross-section along VIC—VIC' in FIG. 6A;

FIGS. 7A to 7E are diagrams for explaining the arrangement of electromagnets according to the present invention, in which FIG. 7A is a plan view of the arrangment in an embodiment of the invention, FIG. 7B is a cross-section along VIIB—VIIB' in FIG. 7A, FIG. 7C is a cross-section along VIIC—VIIC' in FIG. 7A, FIG. 7D is a cross-section along VIID—VIID' in FIG. 7A, FIG. 7E is a diagram illustrating another embodiment of the present invention in which coils are wound also on the outer magnetic poles, and FIG. 7F is a diagram illustrating a further embodiment of the present invention in which the electromagnets are independently arranged which is adapted to be applied to an apparatus exclusively used for shift function (forcibly rolling down);

FIGS. 8A to 8C are diagrams for explaining the excitation currents in the case where the electromagnets are divided into three groups, FIGS. 8D to 8F are diagrams for explaining the excitation current for the respective groups of the electromagnets in the case they are excited in forward and backward directions alternately, and FIG. 8G is a diagram for explaining the case where the electromagnets of the group A are excited in the forward direction;

FIG. 9A is a block diagram illustrating the circuit arrangement according to the present invention for controlling the excitation currents for the electromagnets, FIG. 9B shows an example of current waveforms in the case where the apparatus is used for performing the shift function, and FIG. 9C shows an example of current waveforms in the case where the apparatus is used for performing low noise transportation;

FIG. 10 is a detailed circuit diagram of the DC source and switching portions of FIG. 9A;

FIG. 11 is a diagram of an example of the circuit for generating a forward/backward excitation pattern for the excitation current;

FIG. 12 is a diagram of an example of the circuit of a phase-shift pulse generator;

FIG. 13 is a diagram of an example of the circuit of a ring counter in the case of four phases;

FIGS. 14A to 14C are diagrams for explaining a still further embodiment of the present invention; and FIG. 15 is another embodiment of the present invention in which two inner sub-poles are provided.

Prior to the description of the preferred embodiments of the present invention, basic matters with respect to the invention will be described.

Figure 1:
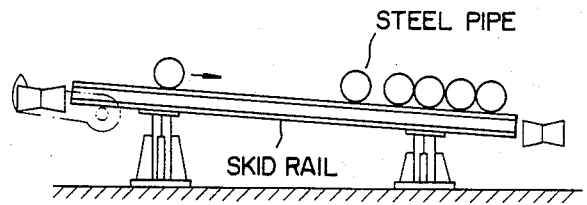
FIG. 1 is a schematic diagram for explaining the rolling down of steel pipes in the steel pipe transporting apparatus.

FIG. 1 shows the state in which steel pipes are transported in such a manner that they roll down on inclined or slanted skid rails.

Figure 2A:
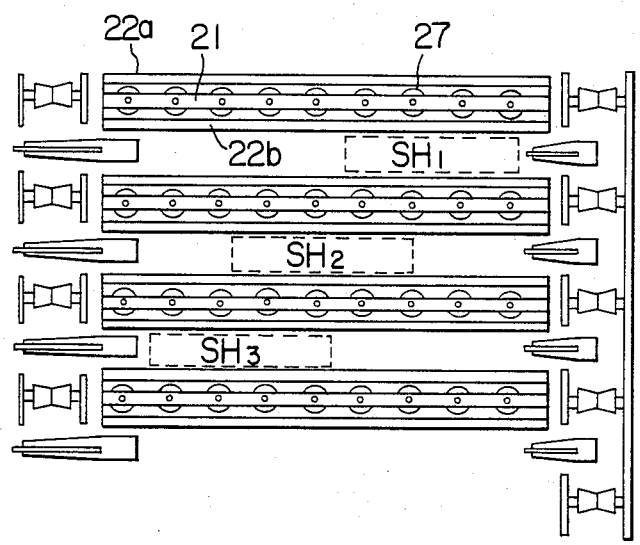
FIG. 2A is a plan view of the low-noise steel-pipe transporting apparatus which the inventors of this application have been proposed.
Figure 2B:
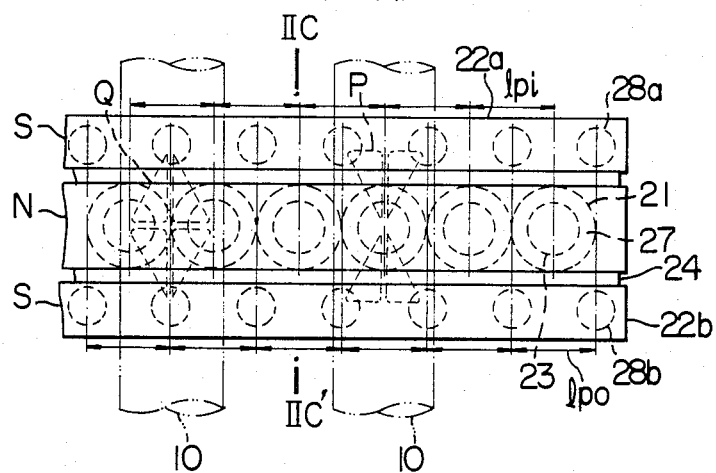
FIG. 2B is a partial enlargement of FIG. 2A.
Figure 2C:
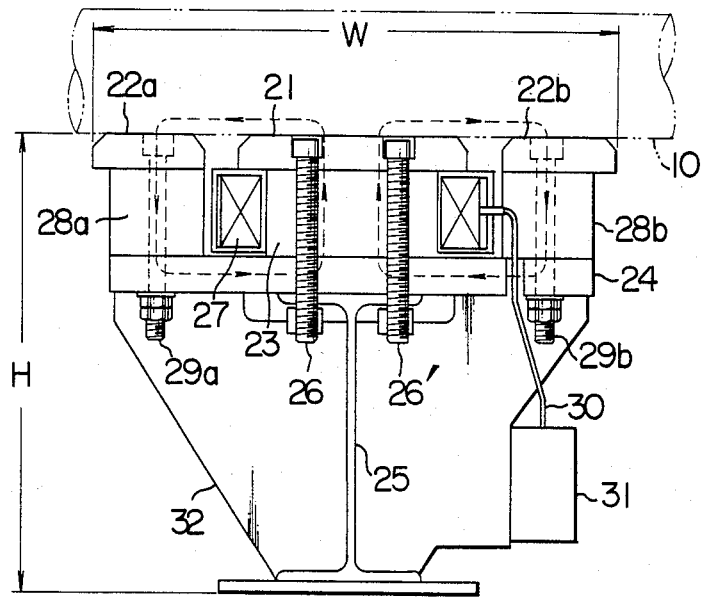
FIG. 2C is a cross-section along IIC—IIC' in FIG. 2B.

FIG. 2A is a top view of the transporting apparatus of FIG. 1, in which reference numerals 21, 22a, 22b designate skid rails and 27 designates an electromagnetic coil, FIG. 2B is an enlarged partial view when steel pipes 10 are being actually transported, and FIG. 2C is a cross-section along IIC—IIC' in FIG. 2B.

The iron core of each of inner electromagnetic poles 23 is fixed to a steel plate 24. Outer electromagnetic poles 28a and 28b are attached under the skid rails 22a and 22b respectively. The inner poles are arranged at a pitch of $l_{pi}$ and the outer poles are arranged at a pitch of $l_{po}$. The symbols S and N designate the polarities of the electromagnets when excited, and P and Q designate magnetic paths formed through a steel pipe.

In FIG. 2C, reference numerals 26, 26', 29a and 29b designate screw bolts; 25 a frame; 32 a rib for reinforcing the frame 25; 31 an excitation power source; and 30 a power supply line to the electromagnetic coils. Steel pipes are transported by the thus arranged apparatus. Brief description will be made here as to the case where a steel pipe stops due to its bead or the like.

Figure 3:
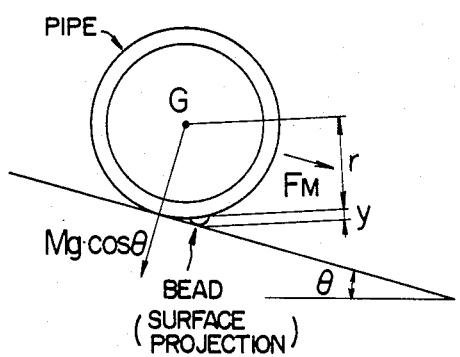
FIG. 3 is a schematic diagram for explaining a steel pipe with a bead.

FIG. 3 shows the case where a steel pipe has a bead. When a steel pipe has a curved portion, the skid gradient tan $\theta_a$ necessary for rolling down the steel pipe is given experimentally by the following expression:

$$\tan \theta_a \geq \frac{1}{2r} \cdot \left(\frac{x}{1000}\right) \cdot L_p \cdot \beta \tag{1}$$

where
  r: radius of the pipe (mm)
  x: curvature of pipe (mm) represented by a distance from a straight line connecting both ends of the pipe to a remotest point on the pipe line.
  $L_P$: length of pipe (mm)
  $\beta$: compensation factor for curvature of pipe (varying depending on the outer diameter of pipe).

If the height of a surface projection or bead is represented by y, the skid gradient tan $\theta_b$ is given by the following expression:

$$\tan \theta_b \geq \frac{f}{r} = \frac{\sqrt{(r+y)^2 - r^2}}{r} \tag{2}$$

where
  y: height of bead (mm)
  f: coefficient of rotational friction (mm), If both the bead and curvature exist, the necessary skid gradient tan $\theta_{ab}$ is given by the following expression:

$$\tan \theta_{ab} = \tan \theta_a + \tan \theta_b \tag{3}$$

In the actual case, it is necessary to take adhesive force of vanish coating on the steel pipe into consideration to determine the skid gradient. However, as the skid gradient is made larger, the rolling force becomes larger to make the collision force larger and the noises higher.

Figure 4A:
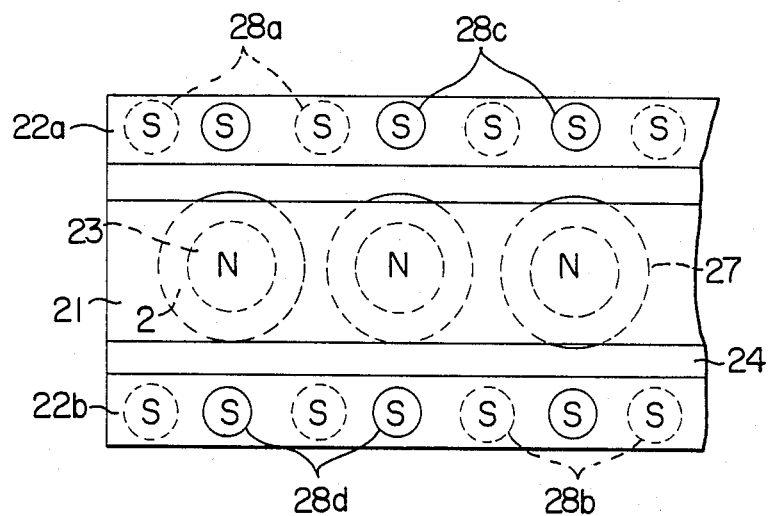
FIG. 4A shows arrangement of outer magnetic poles (S in solid line) according to the present invention in comparison with the arrangement of the magnetic poles (S in broken line) in the case of FIG. 2B.
Figure 4B:
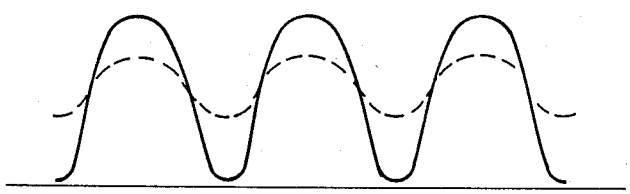
FIG. 4B is a graph showing the distribution of magnetic flux in the case as shown in FIG. 4A, with solid and broken lines correspondingly to those in FIG. 4A.

In the arrangement of electromagnets as shown in FIG. 2B, the electromagnetic force applied to the pipe is small when a steel pipe stops on the skid rails due to its bead or its curvature, for example. The electromagnetic force in this arrangement is schematically illustrated in FIGS. 4A and 4B. In FIG. 4A, the broken line indicates the case in which coils are wound only around the inner poles and the outer poles (28a, 28b) have no coils, while the solid line indicates the case where the outer poles (S) are aligned with each inner pole. FIG. 4B shows the comparison of the electromagnetic force between both cases as mentioned above. In FIG. 4B, the solid line and the broken line correspond to the cases of the arrangement of the outer poles as indicated by the solid line and the broken line in FIG. 4A with the inner poles (23) unchanged. As seen from FIG. 4B, the electromagnetic force shown by the solid line is higher of amplitude measured between its highest point and lowest point than that of the broken line and hence the former provides larger electromagnetic effects than the latter. Further, it has been confirmed that the characteristic shown in FIG. 4B may be further improved if the inner poles are not magnetically connected to each other by removing the skid rail 21 so as to make the electromagnets magnetically separated one from another. Thus, the skid rail 21 is eliminated according to the present invention.

Description will be made as to the case where the excitation control is performed by using such magnetically separated electromagnets. For example, assume now that the magnet M2 is excited when a small diameter steel pipe having a bead is stopping on the skid rails at a position shown in FIG. 5A. In this case the steel pipe will roll down when the following relation is satisfied:

$$F_M = P \cos \alpha \quad (4)$$

where, $$F_M = P\cos\alpha \quad (4)$$

where, $$P = \frac{F_M}{\cos\alpha} = \frac{M_g \sin\theta_c}{\cos\alpha} \quad (5)$$

Mg: acceleration of gravity $F_M$: component of electromagnetic attractive force parallel to the direction of rolling down.

$\theta_c$: skid gradient compensation value corresponding to necessary electromagnetic force.

Further, the equation of motion of a steel pipe of large diameter is given as follows:

$$M \frac{dv}{dt} = \mp Mg \cdot \sin\theta - F_F + F_M \quad (6)$$

$$F_M = Mg \left[ \frac{2f_o}{d_1} \left( 1 + \frac{2}{1 + (d_2/d_1)^2} \right) \cdot \cos\theta \pm \sin\theta \right] \quad (7)$$

where,
$d_1$: outer diameter of steel pipe; and
$d_2$: inner diameter of steel pipe
$F_F$: Rolling friction force.

Assume now that a steel pipe stops rolling due to its bead, as indicated by solid line in FIG. 5B. In such a case, magnetically separated electromagnets as described above are excited to cause the steel pipe to swing against the blocking by the bead and roll down again. This is one of the features of the present invention. The excitation control in this case is shown in FIGS. 5C to 5E.

FIG. 5C is a schematic diagram for explaining the arrangement of the electromagnets divided into three groups which are excited independently of each other, FIG. 5D shows the waveforms for explaining the excitation currents, and FIG. 5E shows the rolling speed of a steel pipe. The three groups of electromagnets are successively excited for periods of $t_1$, $t_2$ and $t_3$, respectively, and the excitation of the three groups is repeated at a period T, thereby causing a steel pipe staying on the skid rails to roll down again.

Next, a preferred embodiment will be described hereunder. Although the description is made with respect to a steel pipe as a material to be transported, the present invention may be applied to any material or article so long as it is rollable. FIG. 6A is a diagram corresponding to the arrangement shown by solid line in FIG. 4A, FIG. 6B is a cross-section along VIB—VIB' in FIG. 6A, and FIG. 6C is a cross-section VIC—VIC' in FIG. 6A.

In FIG. 6A, each of inner poles 23' has an approximately rectangular cross-section so that the inner poles 23' may be arranged closely to each other, while they are magnetically separated from each other. It is preferable to make each electromagnet in a shape as shown in FIG. 6A in order that each magnet produces a sufficiently large electromagnetic force to swing a steel pipe. A coil 27' is wound on each of inner poles 23', while outer poles 28c and 28d are arranged to be magnetic poles having no coils. This will be apparent from FIG. 6B. It will be apparent from FIG. 6C that the respective surfaces of inner poles 23' opposing to a steel pipe 10 are magnetically isolated from each other.

FIG. 7A to 7F are diagrams for explaining the steel pipe transporting apparatus according to the present invention. FIG. 7A correspnding to the case of FIG. 6A but the mounting density of electromagnets is made higher.

FIG. 7B is a cross-section along VIIB—VIIB' in FIG. 7A. In FIG. 7B, it will be understood that only the inner poles 23' have electromagnetic coils 27'. FIG. 7D is a cross-section along VIID—VIID' in FIG. 7A. In FIG. 7D, it is shown that the outer poles 28c are coupled to a yoke 6 as well as to a skid rail 22a for the outer poles. FIG. 7F is a perspective view of another embodiment in which the electromagnets are magnetically separated from each other.

The control of the excitation current for these electromagnets will be described. FIGS. 8A to 8F are diagrams for explaining the excitation current control in the case where the electromagnets are divided into three groups as shown in FIG. 5C. FIGS. 8A, 8B and 8C show the waveforms of the excitation currents for the groups A, B and C of the electromagnets respectively. During the periods $t_1$, $t_2$ and $t_3$, the groups A, B and C of the electromagnets are excited respectively. With exception of special cases, these excitation periods are selected to be $t_1 = t_2 = t_3$. The excitation of this pattern is repeated at a predetermined period T. In FIGS. 8A to 8C, the excitation pattern given at the periods $T_{SHi}$ and $T_{SHi+1}$ is for applying swing by electromagnetic force to a steel pipe staying on the skid rails due to its bead or the like thereby to cause the steel pipe to roll down again as shown in FIGS. 5A to 5E, while the excitation pattern given at the periods $T_{SKi-1}$ and $T_{SKi}$ is for applying braking force to a steel pipe rolling down on the skid rails as shown in FIGS. 2A to 2C. That is, FIGS. 8A to 8C show the excitation current control employed when the steel pipe transporting apparatus is used as means for applying braking force to a rolling steel pipe, as well as shifter means for causing a steel pipe, which stops rolling due to its bead or the like, to roll down again. Generally, the period of $T_{SKi}$ is 5 to 10 minutes and the period of $T_{SHi}$ is 10–30 seconds.

In another example of the apparatus, devices $SH_1$, $SH_2$ and $SH_3$ each having the shift function are provided as indicated by broken lines in FIG. 2A, so that all the devices $SH_1$, $SH_2$ and $CH_3$ or any one or two of them are excited to apply electromagnetic force to the retarding steel pipe to swing and cause them to roll down again when a steel pipe is detected as stopping on the skid rails, and after the rolling down of the pipe has been restarted, the excitation of the devices $SH_1$, $SH_2$ and $SH_3$ is stopped and the original excitation control is performed again. In this case, there is a drawback that the equipment cost increases while the efficiency is high because the individual functions are utilized.

FIG. 8D to 8F show the excitation current waveforms for the respective groups, which are different from each other. This control is featured in that a backward excitation portion is provided in the group excitation such that the backward excitation of one electromagnet group and the forward excitation of the electromagnet group succeeding to the one group overlap. For example, the forward excitation of the electromagnet group B is initiated when the direction of the excitation of the group A is changed to backward. For example, in FIG. 5B, when the excitation of the group C is just changed from forward to backward direction, the forward excitation of the group A is simultaneously initiated. This type of control is advantageous in that larger swing force can be applied to the steel pipe in comparison with the control in which there is no backward excitation or there is no overlap of backward and forward excitations. Large swing force can be effectively obtained by demagnetization of forward excitation residual by the backward excitation even if no additional swing force is applied by the backward excitation. The respective periods $t_P$ and $t_N$ for the forward and backward excitations may be preliminarily set depending on the dimensions and quality of material of the steel pipe.

FIG. 9A is a block diagram illustrating the excitation current control circuit and FIGS. 9B and 9C are diagrams for explaining the operation of the circuit of FIG. 9A. FIG. 9A illustrates the case where the electromagnets are divided into five excitation groups (A to E). As to the group A, for example, a DC supply 124A, a thyristor switching device 130A, and a phase-shift pulse generator 131A may be realized by the same circuit configurations as those shown in FIGS. 8, 12, 13 and 14 in the above-mentioned U.S. Pat. No. 4,088,213 of which the contents are incorporated as reference. However, the pattern setting generator PSG of FIG. 9A of this application is different from the pattern setting generator 32 in FIG. 8 in the above-mentioned U.S. patent. A forward/backward excitation pattern setting means 132 in the PSG of FIG. 9A may be realized by the circuit shown in FIG. 11 in the case of low-noise steel-pipe transportation. Further, the phase-shift pulse generator 131A may be realized by the circuit arrangement of FIG. 12.

In FIG. 10, the DC supply 124A includes diodes 121a to 121c and thyristors 122a to 122c, the thyristor switching device 130A includes thyristors 125a, 125b, 126a and 126b and resistors 127a and 127b, and a magnetic coil arrangement 133A includes a coil 133' and a discharge resistor DR.

As shown in FIG. 11, the forward/backward excitation pattern setting means 132 includes potentiometers 151 and 152, operational amplifiers 178 and 179, field effect transistors (FET) 182a and 182b, delay means 184a, 184b, 185a and 185b, NAND elements 189a, 189b and 190, a flip-flop 188, and FET driving amplifiers 180a and 180b. The circuit is provided with a power supply terminal P15, a common terminal COM, and an output terminal P.

FIG. 12 illustrates an example of the phase-shift pulse generator 131A which includes resistors 160a to 168a, 169 and 170, capacitors 198a and 199b, diodes 191a to 194a, transistors 101a and 102a, a transformer 104a, and output terminals 122a to 122c the outputs from which are used for gate control signals for the thyristors having the same reference numerals in the DC power supply 124A as those of the output terminals.

In FIG. 9A, the PSG is constituted by a gate circuit 202, a ring counter 204, an oscillator 206, and the forward/backward excitation setting means 132 as shown in FIG. 11. The gate circuit 202 produces a signal (signal P in FIG. 12) for the excitation of the groups A to D in response to the output of the ring counter 204 as shown in FIG. 13 (in the cas of four phases). FIG. 13 illustrates an example of the ring counter 204. In the case of three or live phases, the ring counter may be arranged by connecting three or five flip-flops, respectively, in cascade. The ring counter of FIG. 13 is composed of flip-flops 210 to 216, NAND elements 218 to 224, a NOR element 226, and inverter elements 228 to 230.

In FIG. 9A, switches SH and SK are selectively actuated by a mode selector switch 208 to determine the shift or skid mode. FIG. 9B illustrates the excitation current waveforms in the shift mode used in the case where a steel pipe stops rolling due to its curvature or the like, and especially in the three-phase mode where the magnet groups A to C are successively changed over.

FIG. 9C illustrates the waveforms for performing the controll effect as shown in FIGS. 9a to 9c of the above-mentioned U.S. Pat. No. 4,088,213. That is, the forward excitation provides braking effects and the backward excitation facilitates free rolling of the pipe, as well as demagnetization of residual of the forward excitation. The excitation current control in the case where the forward/backward excitation is performed as shown in FIG. 9B is realized in combination with the circuit as shown in FIG. 11. This is not necessary in the case of FIGS. 8A to 8C because only the forward excitation is changed over.

In the case where the SH mode as well as the SK mode are to be performed, it will be done by automatically changing over the mode-changeover switch 208 of FIG. 9A. Generally, in many cases, the control is carried out mainly in the SK mode and the SH mode is inserted at a suitable time interval. Of course, it is possible to usually perform the SK mode and the SH mode is carried out only when the retard of steel pipe is detected.

Another embodiment of the present invention will be described. When steel pipes of various dimensions are to be transported, a plurality of electromagnets of minimum dimension are arranged in order to assure the shift effect for any steel pipe having any dimension. FIGS.

14A to 14C show an example of such an arrangement of electromagnets. FIG. 14A shows an example of arrangement in which electromagnets $M_{1-1}$-$M_{1-9}$ are aligned. The arrangement includes outer poles 28c and 28d, inner poles 23', exciting coils 27' of the inner poles, yokes 24 constituting magnetic paths together with the inner poles 23' and the outer poles 28c and 28d, and a yoke 25. As the yoke 25, a yoke made of a magnetic material is employed since the apparatus is used, generally, for preforming the braking function as well as the shift function, while a yoke made of a non-magnetic material may be employed when the apparatus is used exclusively for performing the shift function.

FIG. 14B is a diagram for explaining the excitation control for the arrangement of FIG. 14A. FIG. 14B shows the case where the electromagnets A1 and B1 of FIG. 5B are constituted by electromagnet pieces $M_{1-1}$-$M_{1-10}$ and $M_{2-1}$-$M_{2-10}$ respectively, so that the electromagnets are divided into ten groups. The excitation current is changed over such that the respective groups are successively excited as shown in FIG. 14C. By performing such successive excitation, various steel pipes having various diameters can be sufficiently transported. In this case, the minimum size of electromagnet is selected so that are electromagnet having the minimum size is sufficient to cause a steel pipe to roll.

In FIG. 14B, a switching circuit 130', a power source transformer 120' and a phase-shift pulse generator 131' may be realized by the same circuits as those circuits 130A, 120, and 131A in FIG. 9a. FIG. 7E shows the case in which exciting coils are wound also on the outer poles and which corresponds to the case of FIG. 7D. That is, FIG. 7E shows a cross-section along VIIE—VIIE' in FIG. 7A, and electromagnetic coils are wound on the outer poles 28d on the opposite side. In this embodiment, the steel pipe driving force due to electromagnetic force is increased.

FIG. 15 illustrates a further embodiment of the present invention in which one inner pole is constituted by a plurality of sub-poles each having an excitation coil wound thereon. In FIG. 15, the inner pole is constituted by two sub-poles each provided with an electromgnetic coil wound thereon. According to this embodiment, it is possible to increase the electromagnetic force acting on the steel pipe.

The excitation for the braking function as well as the excitation for the shift function are selectively performed in the case shown in FIGS. 8A to 8F, this control may be performed such that the excitation for the shift function is performed at a predetermined period, the excitation for the shift function is performed only when the retard of steel pipe is detected by a suitable means.

FIG. 7F illustrates a still further embodiment of the present invention in which the respective electromagnet pieces are magnetically separated. This arrangement is advantageous in the case where it is used only for performing the shift function ($SH_1$-$SH_3$) as indicated by broken lines in FIG. 2A.

What is claimed is:

1. In an apparatus for transporting a material to be transported, said apparatus comprising a plurality of rails slantingly arranged from a feed-in end to a feed-out end of said apparatus so that said material is transported by rolling down on said rails from said feed-in end to said feed-out end, said apparatus further comprising a plurality of electromagnets arranged along said rails, a method of controlling the excitation current for said electromagnets comprising the steps of:

dividing said plurality of electromagnets in order from said feed-in end to said feed-out end into a plurality of sets such that each of said sets consists of said electromagnets N in number;

dividing said plurality of electromagnets into N groups from a first group consisting of a first one of said N electromagnets constituting each of said plurality of sets to an N-th group consisting of an N-th one of said N electromagnets constituting each of said plurality of sets; and successively performing the excitation for said plurality of electromagnets from said first group to said N-th group in order group by group, said successive excitation being repeated.

2. A method as defined in claim 1, in which the excitation current control is performed only for a predetermined period at every predetermined period, while all of said plurality of electromagnets are simultaneously subject to forward/backward excitation.

3. A method as defined in claim 1, in which the excitation for said N groups performed successively group by group is performed with a forward exciting current.

4. A method as defined in claim 1, in which the excitation for said N groups performed successively group by group is performed with a forward/backward exciting current, and in which after the backward excitation for said first group has been performed the forward excitation for the group succeeding said first group is performed.

5. A method as defined in claim 1, in which the forward excitation for said succeeding group is initiated so as to overlap on the backward excitation upon completion of the forward excitation for said first group.

6. A method as defined in claim 1, further comprising the step of repeatedly performing a forward/backward excitation simultaneously on all of said plurality of electromagnets, the step of said simultaneous excitation being selectively interrupted and the step of said successive excitation being carried out only during interruption of the step of said simultaneous excitation.

7. A transporting apparatus provided with a plurality of skid rails slantingly arranged from a feed-in-end to a feed-out end of said apparatus so as to transport a material by causing said material to roll down on said skid rails from said feed-in to said feed-out end, said apparatus comprising a plurality of electromagnets arranged along said skid rails from said feed-in end to said feed-out end, each of said electromagnets including an inner pole having an upper end portion which faces the material when the material rolls on said skid rails and a lower end portion which is connected to a common base, an exciting coil wound on said inner pole, and a pair of outer poles respectively disposed below two associated skid rails, each of said outer poles having an upper end portion connected to one of said associated skid rails and a lower end portion connected to said common base, the upper end portions of said inner poles of said plurality of electromagnets being magnetically separated from each other.

8. A transporting apparatus as defined in claim 7, in which said pair of outer poles of each of said electromagnets is provided with an exciting coil wound thereon so as to allow said outer poles to be excited with an exciting current having opposite polarity to that of an exciting current for the associated inner pole.

9. A transporting apparatus as defined in claim 7, in which said inner pole of each of said electromagnets is divided into two inner sub-poles so as to constitute a pair of inner-outer pole sets, one of said pair of sets consisting of one of said inner sub-poles and one of outer poles adjacent to said one inner sub-pole and the other set consisting of the other inner sub-poles and the other outer pole adjacent to said other inner sub-pole.

* * * * *